United States Patent Office 3,335,066
Patented Aug. 8, 1967

3,335,066
PROCESS OF PURIFYING A TRANSGLUCOSIDASE-
AND AMYLOGLUCOSIDASE-CONTAINING FUN-
GAL ENZYME PREPARATION
Julian Corman, Muscatine, Iowa, assignor to Grain Processing Corporation, Muscatine, Iowa, a corporation of Iowa
No Drawing. Filed Oct. 2, 1964, Ser. No. 401,242
6 Claims. (Cl. 195—31)

This invention relates to the treatment of starch hydrolyzing enzyme preparations and to an improved enzymatic process for the production of hydrolyzates of starch and starch products having exceptionally high dextrose content.

Although the presence of starch hydrolyzing enzymes is widespread within the plant and animal kingdom, sources of microbiological origin are most commonly used in industry in the enzymatic saccharification of liquefied starch to form dextrose-containing syrup. The culture filtrates of *Aspergillus phoenicis*, *Aspergillus diastaticus*, *Aspergillus usamii* and *Aspergillus niger* produce excellent enzyme systems which hydrolyze liquefied starch to dextrose. Cultures of *Aspergillus niger* are particularly advantageous.

The broth resulting from the fermentation of these organisms generally contains several enzymes having different activities, some of which interfere with the production of dextrose when the enzyme preparation is employed to hydrolyze starch. Thus, for example, in the culture broth of *Aspergillus niger* three predominant enzyme systems have been identified, namely, alpha-amylase, glucoamylase (amyloglucosidase) and transglucosidase. Alpha-amylase attacks gelatinized starch by a random type of splitting of the starch molecule, thus causing a desirable reduction in the viscosity of the gelatinized starch dispersion. This dispersion contains a linear fraction from amylose of polymerized dextrose attached in the alpha-1,4-positions and a branched polymer from amylopectin which also contains alpha-1,4-linkages but in addition has branched positions adjoining with alpha-1,6-linkages.

In contrast to the multi-chain action of alpha-amylase, the action of glucoamylase is thought to be a "single-chain" action where an enzyme molecule attaches to the dextrin and detaches one glucose unit at a time from the dextrose chain and thus theoretically converts the starch quantitatively to dextrose. The action of glucoamylase on dextrin polymers is much more specific at the alpha-1,4- glucosidic bonds than the alpha-1,6-glucosidic bonds in that it will cleave the former type bond approximately 30 times as fast as the latter type bond. One unit of glucoamylase is capable of saccharifying soluble starch at a rate equivalent to one gram of dextrose per hour at 60° C. and pH 4.3 provided that not more than 25 percent of the substrate is saccharified during the assay.

The presence of transglucosidase with glucoamylase in enzyme preparations detracts from the potential yield of dextrose in the hydrolyzate. Transglucosidase is known to catalyze transglucosylation reactions between dextrose, maltose and other intermediate saccharified products. As a result, upon completion of the saccharification reaction saccharides other than dextrose are still present in substantial amounts.

Accordingly, it is highly desirable to separate the desired glucoamylase enzyme from other enzymes, principally transglucosidase, present in fungal enzyme preparations which, in the hydrolysis of starch, interfere with the formation of dextrose.

The present invention provides a process for purifying glucoamylase-containing fungal enzyme preparations to inactivate and/or separate therefrom enzymes which, in the hydrolyzation of starchy materials, interfere with the production of dextrose. The present invention also provides a process for hydrolyzing starch to obtain high yields of dextrose by subjecting a liquefied starchy material to the action of a purified glucoamylase-containing fungal enzyme preparation from which there has been removed those enzymes which interfere with the production of dextrose.

In accordance with the present invention a glucoamylase and transglucosidase-containing fungal enzyme preparation is purified by treating an aqueous dispersion thereof with an anionic ion exchange resin. The anionic resins are employed in amounts sufficient to provide in the fungal enzyme preparation undergoing treatment a pH above about 9.

Ion exchange resins of the anion exchange types are well known in the art. Any ion exchange resin capable of providing a pH in the range specified is suitable for use in the present invention. Various ion exchange resins are commercially available from several manufacturers or distributors under different tradenames. The tradenames and characteristics of a number of commercial ion exchange resins are tabulated below:

| | Diamond Alkali Co. | Dow Chemical Co. | Ionac Chemical Co. | Rohm & Hass Co. | Nalco Chemical Co. | The Permutit Co. |
|---|---|---|---|---|---|---|
| Trade Name | Doulite | Dowex | Ignac | Amberlite | Halcite | Permutit |
| Active Group: | | | | | | |
| —NH(R) | A-2 | 3 | A-315 | IR-45 | WBR | W |
| —N(R)$_2$ | A-4 | | A-330 | | | CCG |
| —N(R)$_2$ | A-6 | | | | | |
| —NH(R) | A-7 | | | | | Deacidite. |
| —N(R)$_2$ | }A-30B | | A-300 | | | A |
| —N(R)$_3$+ | | | | | | |
| —N(R)$_2$ | A-30T | | | | | |
| —N(R)$_3$+ (1) | A-101, A-101D | 1,21K | A-540 | IRA-400, -402 | SBR, SBR-P | |
| —N(R)$_3$+ (2) | A-102D | 2 | A-550 | IRA-410 | SAR | S-2 |
| —Cu° | S-10 | | | | | |
| —ΦOH | S-30 | | | | | |

As is known in the art, the ion exchange resins vary somewhat in their characteristics and may be classified as strongly basic anion exchange resins and weakly basic anion exchange resins. The characteristics of a number of commercial ion exchange resins classified on this basis is as follows:

| Type of Resin | Designation | Functional Group | Matrix | Ionic Form |
|---|---|---|---|---|
| Strongly Basic Anion Exchanger | IRA-400 | $-N-(CH_3)_3{}^+$ | Mod.[1] S-DVB | Cl |
| | A-101 | $-N-(CH_3)_3{}^+$ | Polystyrene | Cl |
| | Dowex 1, 21K | $-N-(CH_3)_3{}^+$ | S-DVB | Cl |
| | IRA-410 | $-N\ C_2H_4OH(CH_3)_2{}^+$ | Mod. S-DVB | Cl |
| | A-102D | $-N\ C_2H_4OH(CH_3)_2{}^+$ | Polystyrene | Cl |
| | Dowex-2 | $-N\ C_2H_4OH(CH_3)_2{}^+$ | S-DVB | Cl |
| Weakly Basic Anion Exchanger | IR-4B | Polyamine | Polyphenol formaldehyde | CH |
| | IR-45 | ...do... | Mod. S-DVB | CH |
| | A-2, A-4, A-6, A-7 | ...do... | Phenolic S-DVB | $SO_4$, Cl, Cl, $SO_4CH$ |

[1] Chloromethylated polystyrene—divinylbenzene.

The ion exchange resins are available in solid form of beads or granules. The purification treatment of the present invention is preferably carried out by passing an aqueous dispersion of the glucoamylase-containing fungal enzyme preparation to be purified through a bed of the solid ion exchange resins. Treatment can also be conducted by agitating the ion exchange resin with the fungal enzyme preparation for a period of from about 10 minutes to 10 hours, after which the mixture is filtered or centrifuged. The undesired transglucosidase enzyme either is inactivated or remains in the ion exchange bed while the effluent therefrom contains the glucoamylase enzyme substantially devoid of active transglucosidase. Furthermore, by treatment in this manner the glucoamylase preparation is maintained at a high pH for relatively short periods of time, while it is passing through the ion exchange resin bed, thereby minimizing the possibility of destruction or inactivation of the desired glucoamylase. The purification treatment affords good recovery of the glucoamylase. Not only is the transglucosidase inactivated or removed by means of the ion exchange resins, but there is also a marked improvement in the color of the glucoamylase effluent.

To insure effective removal of the transglucosidase activity with minimum loss in glucoamylase activity, the present purification treatment is carried out at a temperature within the range from about 5 to about 45° C., preferably at a temperature from about 15 to 35° C. Higher temperatures can be used but at the higher temperatures inactivation of the desired glucoamylase occurs. As indicated, a sufficient amount of the ion exchange resins is employed to provide a pH above about 9 in the case of anionic exchange resins.

One convenient method for determining qualitatively the transglucosidase activity is by thin layer chromatography to detect the presence or absence of isomaltose and panose resulting from the action of transglucosidase on a maltose substrate. This method consists essentially of two steps: (1) the reaction of the enzymes on maltose and (2) detection of the reaction products formed by thin layer chromatography. The relative amount of transglucosidase in a given sample is determined by visually comparing the color density of the isomaltose and panose spots with those obtained with a transglucosidase-free preparation and a corresponding untreated fungal amylase material. The sugars present are detected by the action of ammoniacal silver nitrate which produces a brown to black color on heating of the chromatoplate. The ultimate test of the effectiveness of the purification treatment is the ability of the treated enzyme preparation to hydrolyze starch to produce hydrolyzates having high dextrose contents, such as dextrose equivalents (D.E.) of 94 to 98 and above.

One specific preferred embodiment of the process of the invention is carried out as follows: A clarified glucoamylase-containing solution is passed through a column containing an anionic exchange resin. The anionic exchange bed is sufficiently large in size so as to effectively provide a pH in the enzyme preparation in contact therewith of above about 9. The enzyme preparation is flowed through the column at a rate of about 35 gallons per square foot of cross sectional bed area per hour and at a temperature of about 25° C. The effluent containing the glucoamylase enzyme substantially devoid of transglucosidase activity which is recovered from the column can be used for starch conversion in this form or it can be concentrated or it can be precipitated by means of a precipitating agent such as alcohol to obtain the glucoamylase enzyme in dry form.

The advantages of the invention will be further illustrated by the following examples.

Example I

An enzyme solution containing 5.4 glucoamylase units per milliliter that was made by redissolving the precipitate formed by addition of methanol to a culture filtrate of *Aspergillus niger* was allowed to flow at a rate of 3 gallons per hour into a 4 inch diameter glass tube containing 0.2 cubic feet of hydroxyl form of the weakly basic anion exchange resin Amberlite XE168 which contains tertiary amine functional groups.

The effluent trickled into containers that were changed at hourly intervals and the contents of each was checked for transglucosidase removal by chromatographic analysis of their hydrolysis of a 10% maltose substrate. In this manner it was determined that the first 30 gallons of effluent contained no transglucosidase. Average glucoamylase assays of the effluent in all containers indicated a recovery of 73 percent of the glucoamylase potency of the influent.

An aliquot of effluent (free of transglucosidase) was then used at a rate of 15 glucoamylase units per 100 grams starch to saccharify 70 gallons of 30% starch dextrin contained in a 100 gallon tank fitted with a water jacket and stirrer and maintained at a temperature of 60° C. and pH 4.2. This saccharification was compared to saccharification of the same substrate under the same conditions but using the enzyme solution prior to ion exchange resin treatment. Analyses of the starch hydrolyzates at 36, 60 and 96 hours showed reducing power values expressed as dextrose equivalent percent of dry substances (D.E.) were as follows:

| Enzyme treatment | D.E. values of starch hydrolyzates | | |
|---|---|---|---|
| | 36 hours | 60 hours | 96 hours |
| Untreated Influent | 84.5 | 90.6 | 92.2 |
| Ion Exchange Resin Effluent | 92.2 | 94.6 | 95.6 |

The improved saccharification efficiency of the resin treated enzyme solution is readily apparent.

Example II

Fifteen milliliters of a glucoamylase solution of pH 8.0 containing 15.4 glucoamylase units per milliliter (which was made by redissolving the precipitate formed by addition of methanol to a culture filtrate of *Aspergillus niger*) was pipetted into a shake flask containing 5 grams of an ion exchange resin and the mixture was agitated on a reciprocal shaker for an hour at 30° C. The ion exchange resin is a porous quaternary ammonium strongly basic anion exchange resin which was used in the hydroxyl form (Duolite ES111).

The enzyme solution and resin mixture was filtered and the filtrate assayed for glucoamylase potency as well as checked for removal of transglucosidase by chromatographic analysis of its action on maltose. The resin treated filtrate assayed 5.4 glucoamylase units per milliliter and a chromatogram of the maltose hydrolyzate indicated the enzyme solution was free of transglucosidase.

Saccharification of 100 grams of enzyme liquified dextrin (30% solids) by both the untreated and resin treated enzyme solutions were made as follows. An amount of resin treated filtrate equivalent to 5 glucoamylase units was added to 100 grams enzyme liquefied dextrin (30% solids) adjusted to pH 4.1. The mixture was placed into a shake flask and agitated at 60° C. on a reciprocal shaker. The dextrose equivalent values (D.E.) attained at 72 hours and 96 hours in both starch hydrolyzates were:

| Enzyme treatment | D.E. values of starch hydrolyzates | |
| --- | --- | --- |
| | 72 hours | 96 hours |
| Untreated enzyme (control) | 93.6 | 94.8 |
| Duolite ES111 resin treatment | 95.3 | 96.6 |

The above results vividly demonstrate the improved saccharification properties of glucoamylase-containing preparations which are purified in accordance with the present invention.

Those modifications and equivalents which fall within the spirit of the invention and the scope of the appended claims are to be considered part of the invention.

I claim:
1. A process of purifying a transglucosidase-and glucoamylase-containing fungal enzyme preparation which comprises treating said preparation in aqueous medium with an anion exchange resin, said resin being employed in an amount to provide in the fungal enzyme preparation undergoing treatment a pH above about 9, separating the thus treated fungal enzyme preparation from the anion exchange resin to obtain an aqueous medium containing glucoamylase enzyme which is substantially devoid of active transglucosidase.

2. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium with an anion exchange resin, said resin being employed in an amount to provide in the fungal enzyme preparation undergoing treatment a pH above about 9, and after said treatment the fungal enzyme preparation being separated from the anion exchange resin to obtain an aqueous medium containing glucoamylase enzyme which is substantially devoid of active transglucosidase.

3. The process of claim 1 wherein treatment with the anion exchange resin is carried out at a temperature between 5 and 45° C.

4. The process of claim 1 wherein treatment with the anion exchange resin is carried out at a temperature between about 15 and 35° C.

5. The process of claim 1 wherein the transglucosidase- and glucoamylase-containing fungal enzyme preparation is derived from the Aspergillus genus.

6. The process of claim 1 wherein the transglucosidase- and glucoamylase-containing fungal enzyme preparation is derived from *Aspergillus niger*.

References Cited

UNITED STATES PATENTS

| | | | |
| --- | --- | --- | --- |
| 3,108,928 | 10/1963 | Kathrein | 195—31 |
| 3,117,063 | 1/1964 | Hurst et al. | 195—31 |
| 3,254,003 | 5/1966 | Croxall | 195—66 |

A. LOUIS MONACELL, *Primary Examiner.*

L. M. SHAPIRO, *Assistant Examiner.*